United States Patent [19]

Murakami

[11] Patent Number: 5,552,969
[45] Date of Patent: Sep. 3, 1996

[54] VEHICULAR LAMP DEVICE

[75] Inventor: Tomokazu Murakami, Shizuoka, Japan

[73] Assignee: Koito Manufacturing Co., Ltd., Tokyo, Japan

[21] Appl. No.: 409,606

[22] Filed: Mar. 24, 1995

[30] Foreign Application Priority Data

Mar. 28, 1994 [JP] Japan .................... 6-079258

[51] Int. Cl.$^6$ ........................................ B60Q 1/00
[52] U.S. Cl. .................. 362/61; 362/80; 362/243; 362/245; 362/248
[58] Field of Search ................. 362/61, 66, 80, 362/243, 245, 246, 247, 248, 328

[56] References Cited

U.S. PATENT DOCUMENTS

| | | | |
|---|---|---|---|
| 4,912,606 | 3/1990 | Yamamoto | 362/61 |
| 5,081,564 | 1/1992 | Mizoguchi et al. | 362/61 |
| 5,172,972 | 12/1992 | Terao | 362/61 |
| 5,398,172 | 3/1995 | Kojima et al. | 362/61 |

*Primary Examiner*—Denise L. Gromada
*Assistant Examiner*—Alfred Basichas
*Attorney, Agent, or Firm*—Sughrue, Mion, Zinn, Macpeak & Seas

[57] ABSTRACT

A vehicular lamp device for a combination tail lamp comprises: a lamp body having a cup shape and an front opening; a bulb supported by the lamp body; a front lens covering the front opening of the lamp body; and a shade for cutting light off except a light emitting area in front of the bulb.

12 Claims, 9 Drawing Sheets

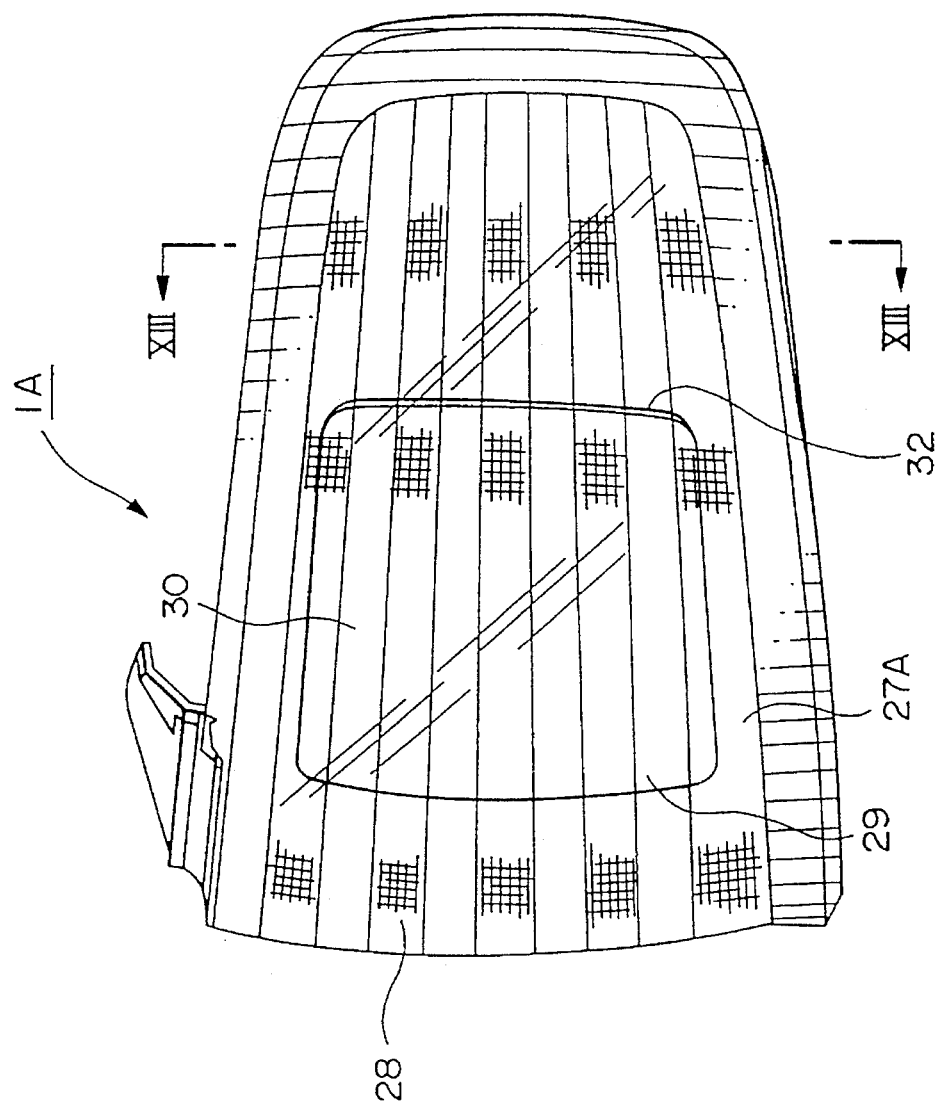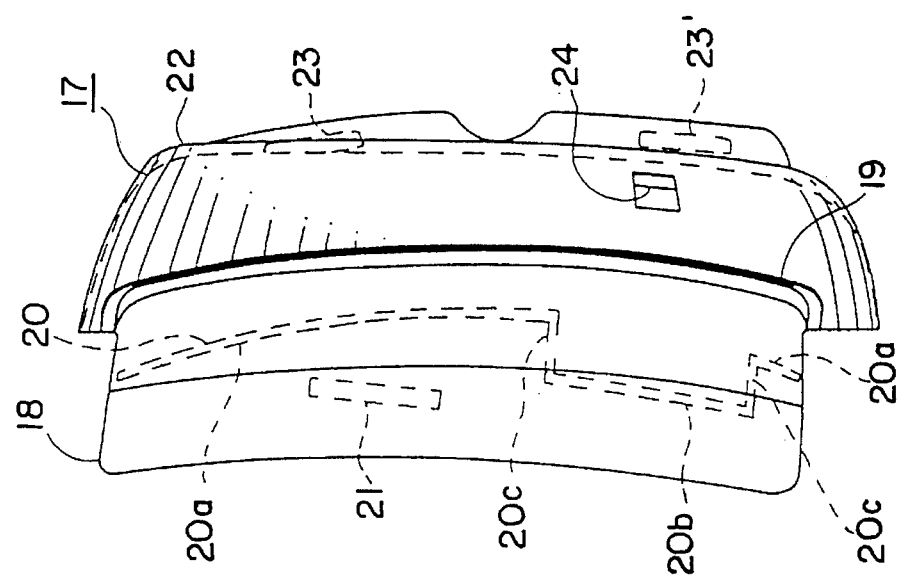

5,552,969

VEHICULAR LAMP DEVICE

BACKGROUND OF INVENTION

1. Field of the Invention

The present invention relates to a vehicular lamp device for a combination tail lamp.

2. Related Art

A conventional vehicular lamp device a for vehicles, e.g., motor vehicles, is generally constructed as shown in FIG. 14. As shown, the vehicular lamp device a includes a lamp body c with a front opening b mounting thereon a front lens d. A bulb e is supported by the lamp body c.

When the bulb e is lit on, light beams emitting from the bulb e are radially diffused through the lens d. Accordingly, when the vehicular lamp device a is viewed from the front side, the entire surface of the lens d is luminous.

In the conventional vehicular lamp device a thus constructed and operating, when it is lit off, since the bulb e and its surrounding area are viewed through the lens d, the external appearance of the vehicular lamp device is deteriorated.

SUMMARY OF THE INVENTION

An object of the present invention is to provide a vehicular lamp device for a combination tail lamp which is improved in the external appearance of the vehicular lamp device when it is lit off and reduced in the cost to manufacture the vehicular lamp device by using standardized component parts.

To achieve the object, the present invention provides a vehicular lamp device for a combination tail lamp, the vehicular lamp device which comprises: a lamp body having a cup shape and a front opening; a bulb supported by the lamp body; a front lens covering the front opening of the lamp body; and a shade for cutting light off except a light emitting area in front of the bulb.

In the vehicular lamp device of the present invention, the shade disposed on the inner side of the front lens hides the bulb and its surrounding area when the lamp is lit off, thereby providing a good external appearance of the lamp.

BRIEF DESCRIPTION OF THE DRAWINGS

FIG. 10 is a left side view showing the auxiliary body;

FIG. 11 is a side view showing a combination tail lamp not having a side marker lamp;

DETAILED DESCRIPTION OF THE PREFERRED EMBODIMENTS

Figure 1:
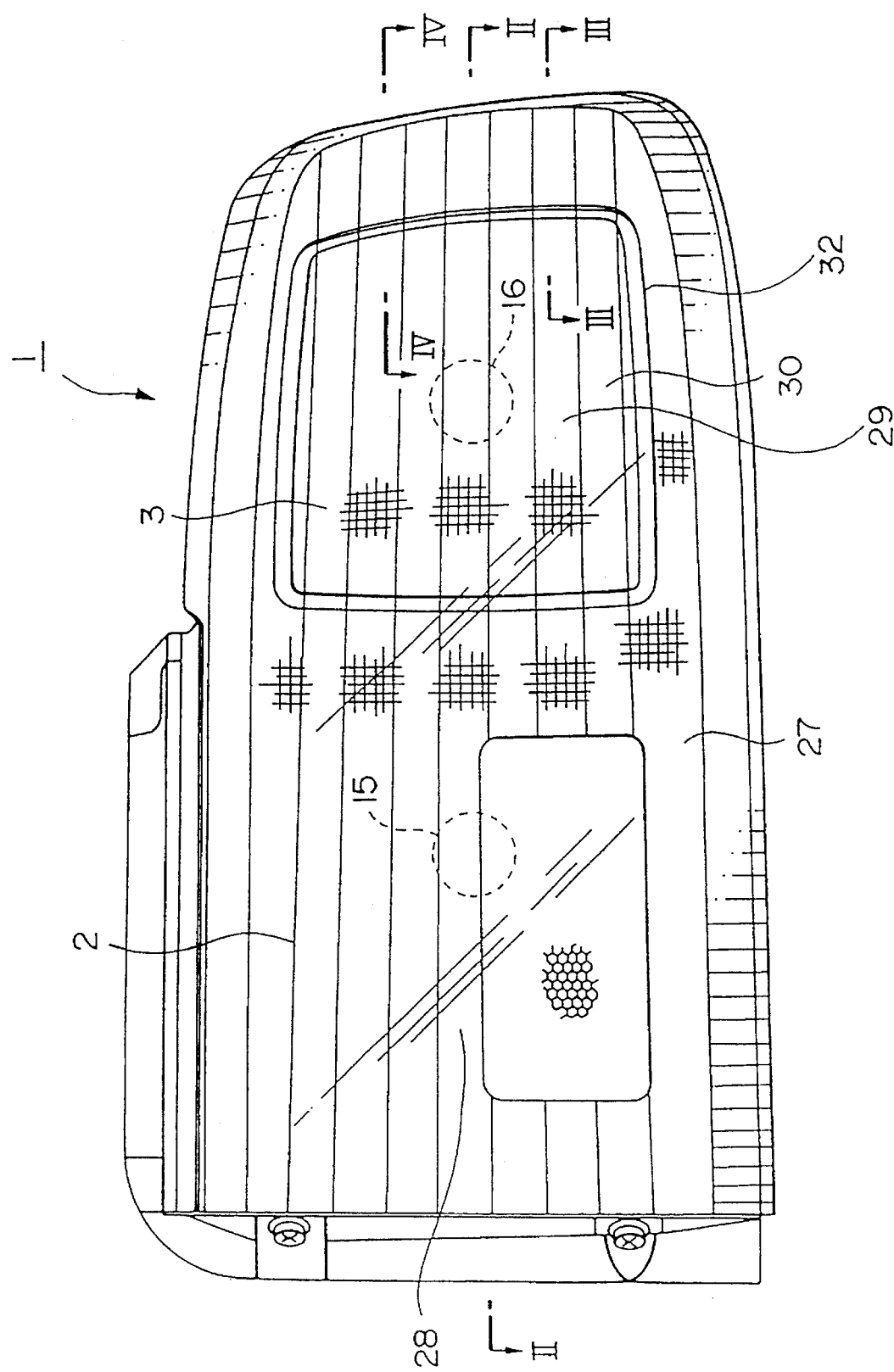
FIG. 1 is a front view showing a combination tail lamp for automobiles incorporating the present invention, which is an embodiment of the present invention, FIG. 1 cooperating with FIGS. 2 through 13 to illustrate the combination tail lamp.
Figure 2:
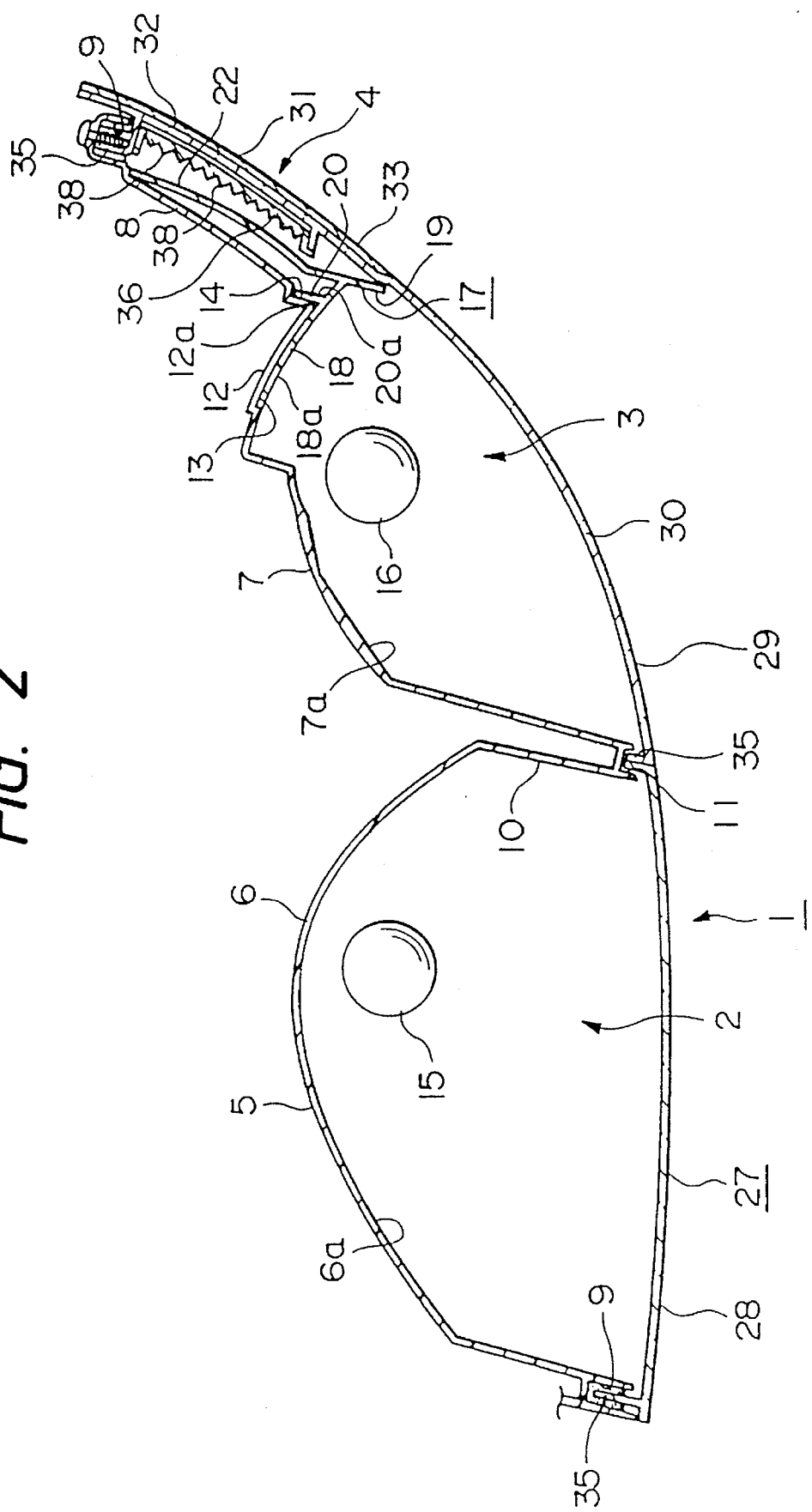
FIG. 2 is a cross sectional view taken on line II—II in FIG. 1.
Figure 3:
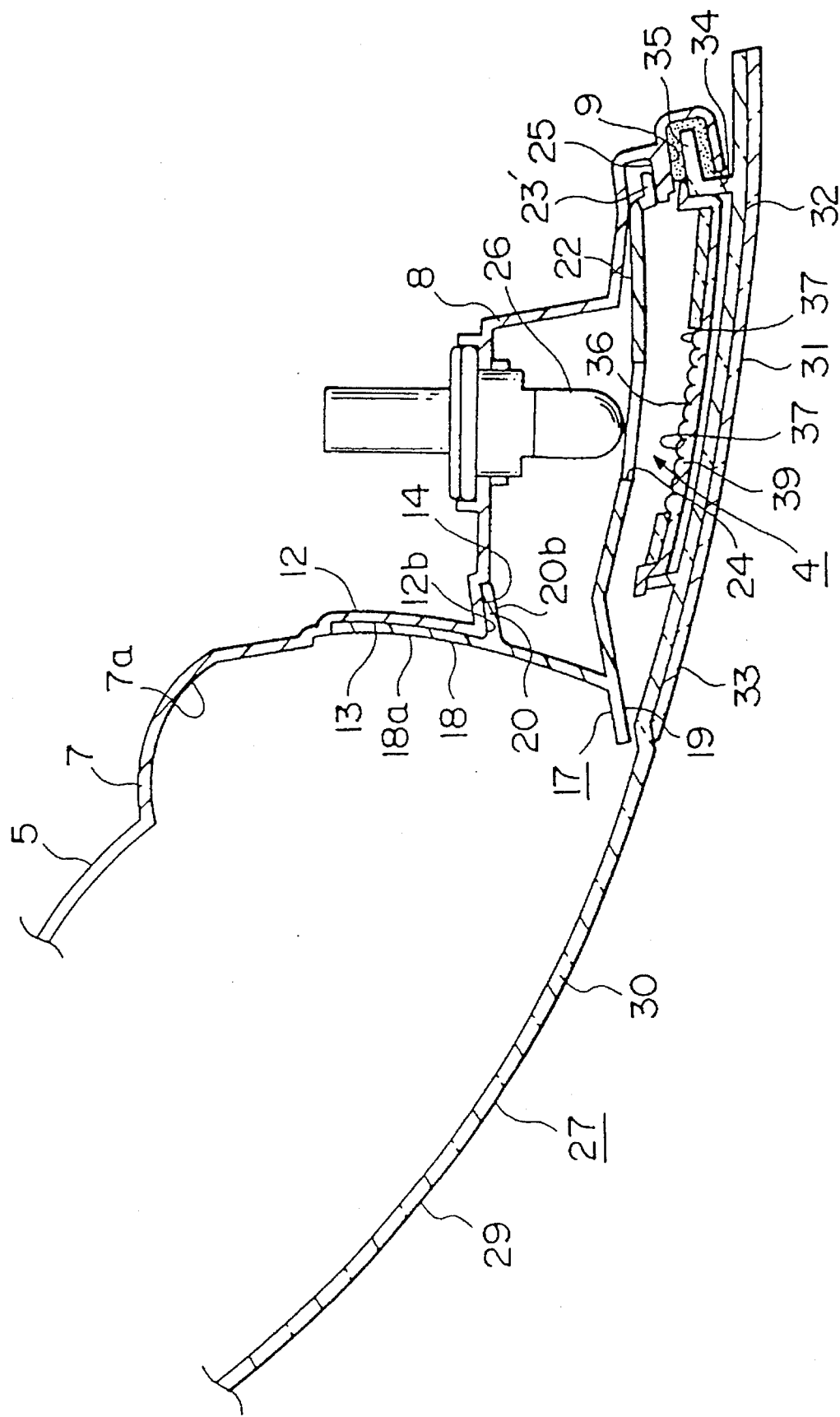
FIG. 3 is a cross sectional view taken on line III—III in FIG. 1.
Figure 4:
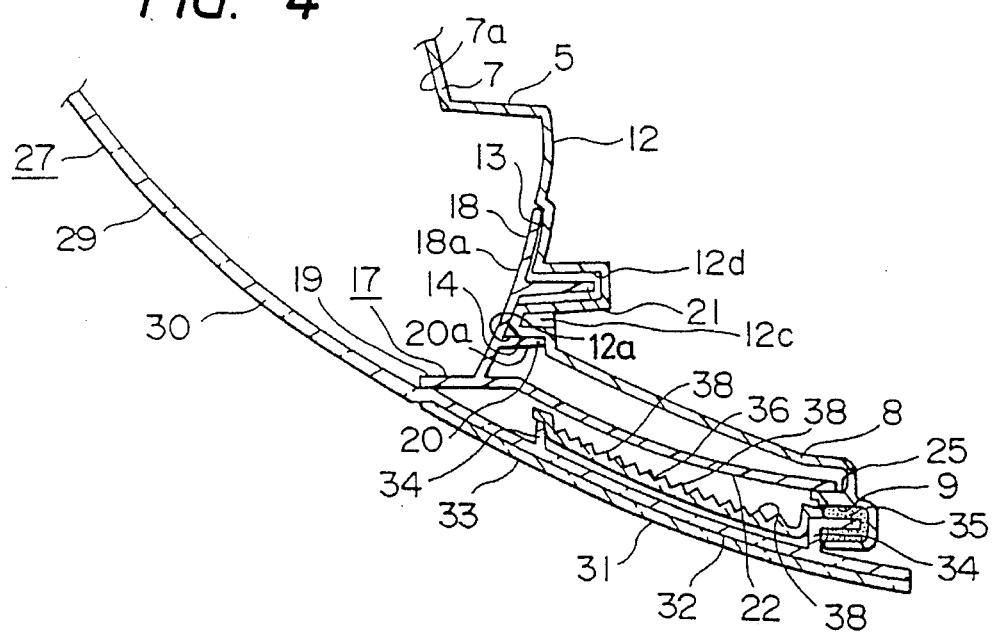
FIG. 4 is a cross sectional view taken on line IV—IV in FIG. 1.
Figure 5:
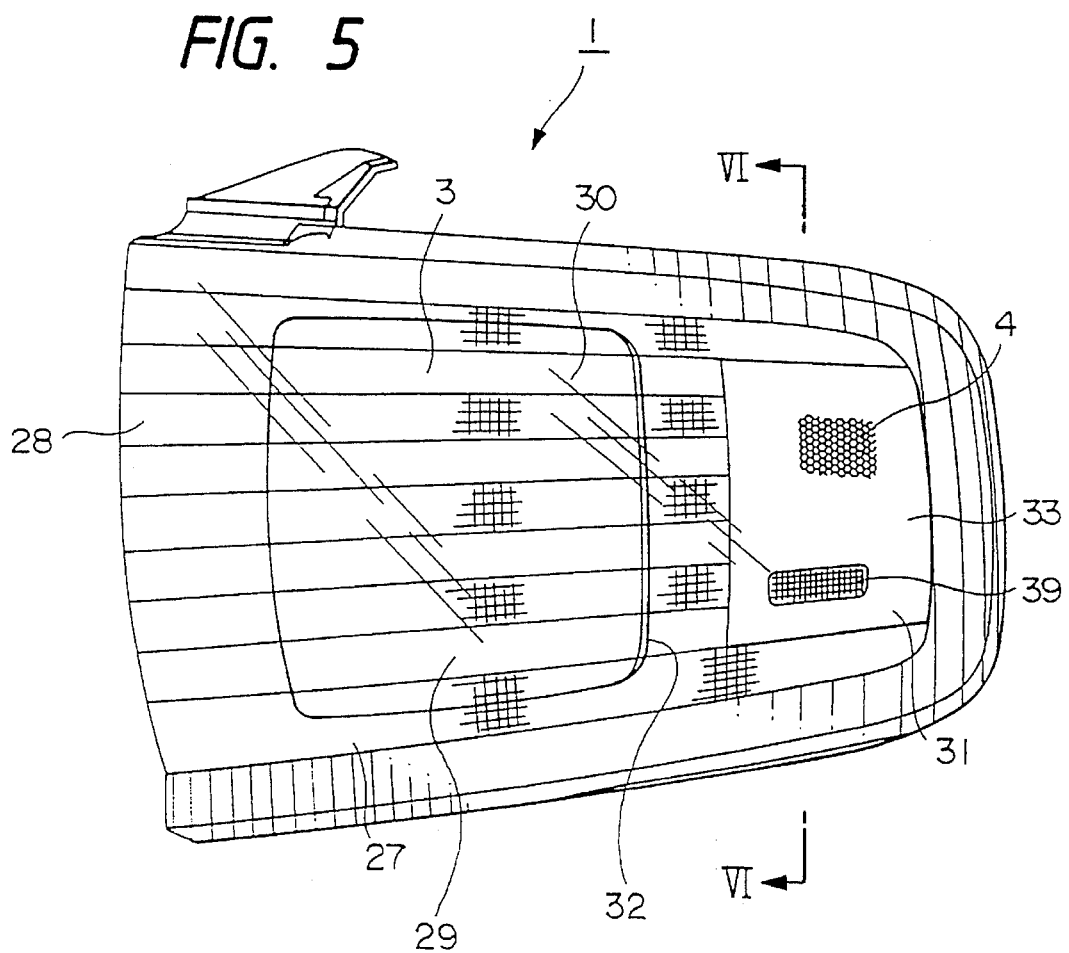
FIG. 5 is side view showing the combination tail lamp.
Figure 7:
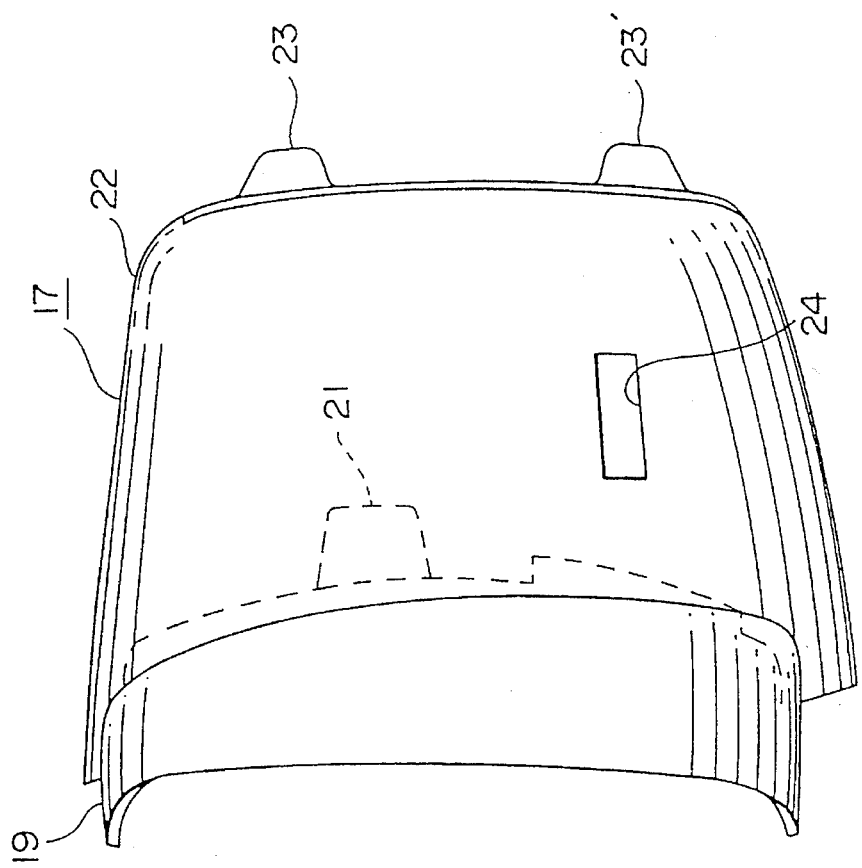
FIG. 7 is a front view showing an auxiliary body.
Figure 6:
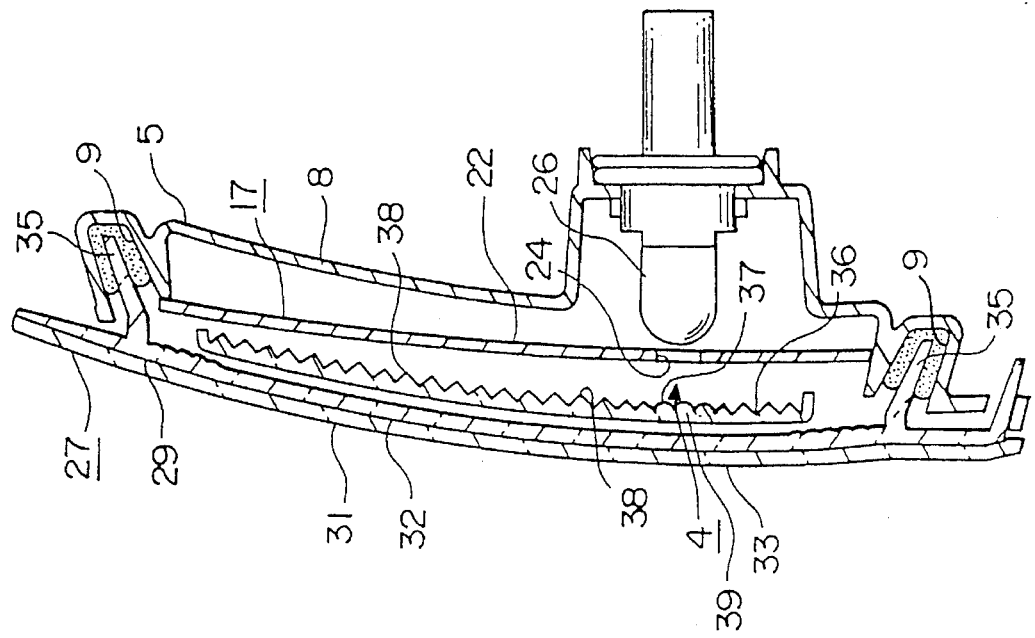
FIG. 6 is a cross sectional view taken on line VI—VI in FIG. 5.
Figure 8:
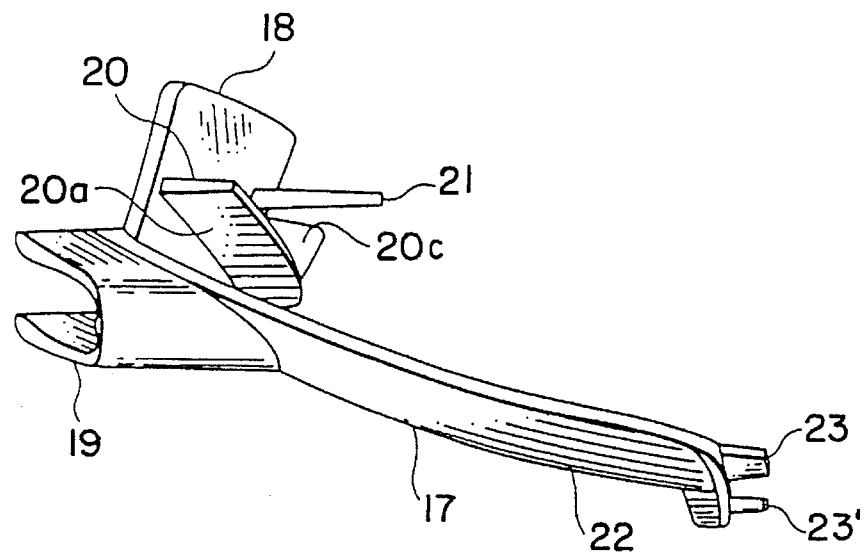
FIG. 8 is a plan view showing the auxiliary body.
Figure 9:
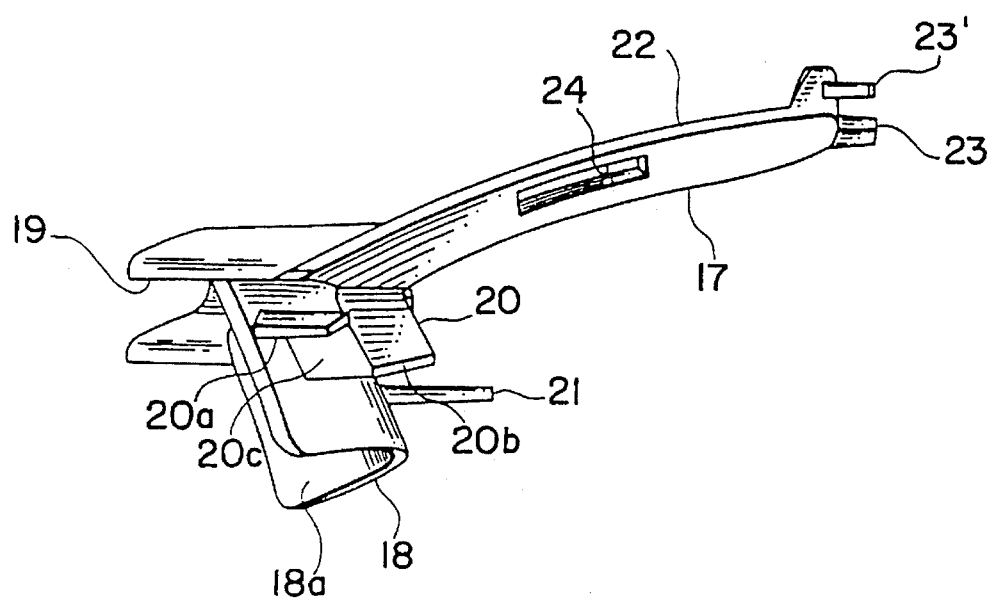
FIG. 9 is a bottom view showing the auxiliary body.
Figure 13:
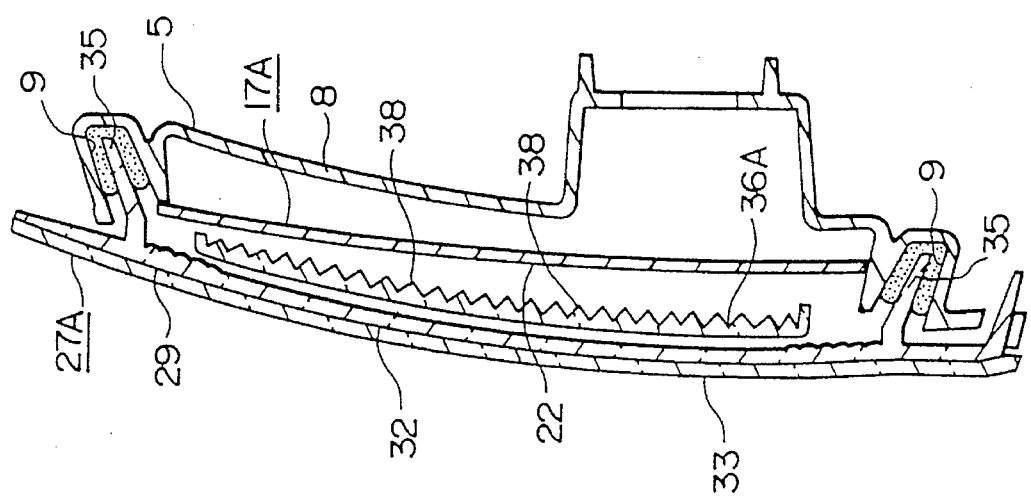
FIG. 13 is a cross sectional view taken on line XIII—XIII in FIG. 11.
Figure 12:
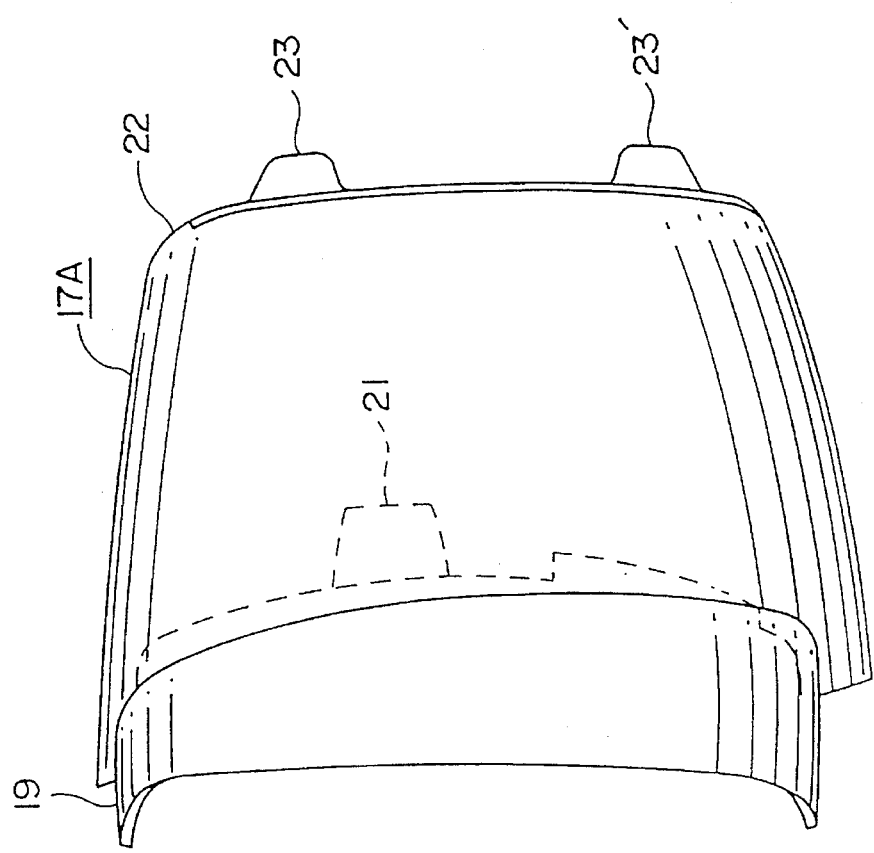
FIG. 12 is a front view showing an auxiliary body used for a combination tail lamp not having a side marker lamp.
Figure 14:
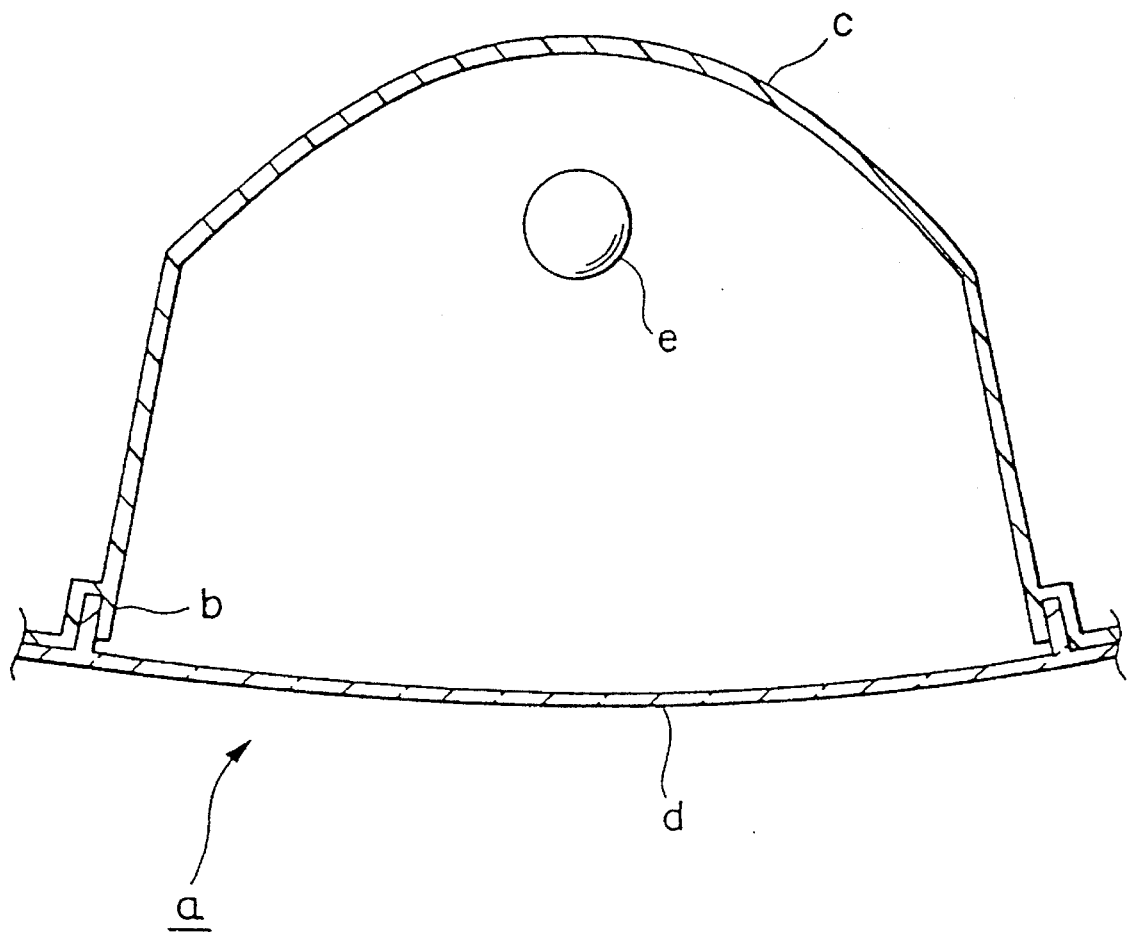
FIG. 14 is a cross sectional view showing an example of a conventional marker lamp.

A vehicular lamp device for vehicles according to the present invention will be described with reference to the accompanying drawings.

Reference numeral 1 designates a combination tail lamp 1 for motor vehicles according to one embodiment of the present invention. The combination tail lamp 1 is constituted by a tail and stop lamp 2, a turn signal lamp 3, and a side marker lamp 4, which are assembled into a single unit.

Reference numeral 5 designates a lamp body 5 made of synthetic resin. The lamp body 5 contains lamp chambers 6, 7 and 8 for the lamps 2, 3 and 4, respectively. The lamp chamber 6 for the tail and stop lamp 2 opens to the front side of the combination tail lamp 1. The lamp chamber 7 for the turn signal lamp 3 opens diagonally to the corner to the combination tail lamp 1. The light chamber 8 for the side marker lamp 4 opens substantially to the side of the combination tail lamp 1. (Here, the terms "front" and "rear" are used in connection with the combination tail lamp 1. The "front" means the side of the combination tail lamp 1 toward which the combination tail lamp 1 emits light, and corresponds to the rear of an automobile on which the combination tail lamp 1 is mounted.)

Inner surfaces 6a and 7a of the lamp chambers 6 and 7 are subjected to form as reflecting surfaces to a proper process such as reflection coating process or aluminum vapor deposition process.

A mounting groove 9 opening to the front is formed on a circumferential edge of the lamp body 5. The lamp chambers 6 and 7 are separated by a partition wall 10. A mounting groove 11 opening to the front is formed in a fore end of the partition wall 10.

A wall 12 of the lamp chamber 7 for the turn signal lamp 3, which is adjacent to the side marker lamp 4, terminates at a location close to the rear part. For the fore edge of the wall 12, a part 12a of the about ⅓ lower portion of the front edge of the wall 12, except the lower end thereof, is located more rearward than the remaining parts 12b thereof. These parts 12a and 12b are connected by parts 12c extending back and forth. The wall 12 is continuous, at these parts 12a, 12b and 12c, to the lamp chamber 8 of the side marker lamp 4. A shallow recessed portion 13 is formed on the inner surface of the wall 12 of the lamp chamber 7 for the turn signal lamp 3, which is adjacent to the side marker lamp 4.

A deep recessed portion 12d, narrow as viewed in the back and forth, protrudes toward the lamp chamber 8 from an upper part of the wall 12 as vertically viewed.

A shallow recessed portion 14 is formed on the front surface of the end part of the lamp chamber 8 for the side marker lamp 4, which is adjacent to the turn signal lamp 3. The end edge of the turn signal lamp 3 of the shallow recessed portion 14 is continuous to the front edge parts 12a, 12b and 12c of the wall 12 of the lamp chamber 7 for the turn signal lamp 3.

Bulbs 15 and 16 are respectively disposed in the lamp chamber 6 for the tail and stop lamp 2 and the lamp chamber 7 for the turn signal lamp 3.

In lamp devices for automobiles, most of all countries have standards. The standards on the structures and the performances of the lamp devices for automobiles are provided for the sake of safety. The standards are frequently different for each country. The SAE standards of U.S.A. require that the side marker lamps are mounted on both the front and the rear portions of the vehicle body, in order that one can recognize the length of the vehicle body. Such is not required in the standards of Japan and Europe.

The combination tail lamp 1 equipped with the side marker lamp for U.S.A. and the combination tail lamp 1 not with the side marker lamp for Japan and Europe may separately be manufactured by merely replacing specific component parts with other ones.

The combination tail lamp 1 with the side marker lamp will first be described.

Reference numeral 17 designates an auxiliary body including a partition wall for separating the lamp chambers 7 and 8 and a shade disposed within the side marker lamp 4. The auxiliary body 17 is made of synthetic resin, such as polypropylene.

A partition wall 18 is a plate-like member of which the central part as vertically viewed is gently curved toward the side marker lamp 4. An inclined part 19 of the front end of the partition wall 18 is inclined slightly to the center of the lamp chamber 7 and to the front.

A mounting plate 20 protrudes from a location on the surface of the partition wall 18, which is close to the front end thereof. A part 20a of the about ⅓ lower portion of the mounting plate 20, except the lower end thereof, is located more rearward than the remaining parts 20b thereof. These parts 20a, and 20b are connected by parts 20c extending back and forth. The positional relationship and the lengths of these parts 20a, 20b and 20c of the mounting plate 20 are substantially the same as those of the parts 12a, 12b and 12c of the front edge of the wall 12.

An engaging piece 21, vertically extending, protrudes from the surface of the partition wall 18, which is adjacent to the lamp chamber 8. The location on the partition wall surface from which the engaging piece 21 protrudes is positioned on the middle rear part of the upper part 20b of the mounting plate 20.

The surface 18a of the partition wall 18 is processed to be formed as a reflecting surface, by a proper process, such as reflection coating process or aluminum vapor deposition process.

Reference numeral 22 designates a shade shaped like a plate. The shade 22 protrudes substantially rearward from the front edge of the partition wall 18. The central part of the shade 22 as vertically viewed is slightly curved to the front. Mounting pieces 23 and 23' protrudes from the front end of the shade 22.

An outer surface of the shade 22 is subjected to form as a reflecting surface to a proper process, such as reflection coating process or aluminum vapor deposition process. Alternatively, it is silver coated. With this, when the lamp is lit off, the outer surface of the shade 22 is visually recognized as if it is integral with the reflection surface of the lamp chamber 7 of the turn signal lamp 3.

A window 24, laterally extending, is formed at the central part of the portion of the shade 22, close to the lower end thereof, when viewed in the back and forth direction.

The auxiliary body 17 is secured to the lamp body 5 in a state that the portion of the auxiliary body 17, located rearward from the mounting plate 20 of the partition wall 18, is placed in the shallow recessed portion 13 of the wall 12 located between the lamp chambers 7 and 8. A suitable means, such as screws, bonding, or welding, may be used for engaging the auxiliary body 17 with the lamp body 5.

The mounting plate 20 of the auxiliary body 17 is placed in the shallow recessed portion 14 formed at the end part of lamp chamber 8 for the side marker lamp 4, which is adjacent to the turn signal lamp 3. A base of the part 20a of the mounting plate 20, a base of the parts 20b thereof, and a base of the parts 20c thereof, respectively, are brought into contact with the part 12a of the front edge of the wall 12, the parts 12b of the front edge of the wall 12, and the parts 12c of the front edge of the wall 12. The engaging piece 21 is inserted into the deed recessed portion 12d of the wall 12.

The mounting pieces 23 and 23' of the shade 22 are placed on the inner side of a step 25 of tile end of lamp chamber 8, which is located on the opposite side of the turn signal lamp 3. A step 25 is also located on the inner side of the mounting groove 9. With this structure, the end of the shade 22 is stably positioned.

The reflecting surface 18a of the partition wall 18 of the shade 22 is integral with the reflecting surface 7a of the lamp chamber 7 of the turn signal lamp 3.

A bulb 26 attached to the lamp chamber 8 of the side marker lamp 4 is placed on the rear side of the window 24 of the shade 22.

A front lens 27 covers all lens section for the lamps 2, 3 and 4. A lens section 28 for the tail and stop lamp 2 is made of red colored transparent synthetic resin. A lens base member 29 forms lens sections 30 and 31 for the turn signal lamp 3 and the side marker lamp 4, respectively. The lens base member 29 is made of orange colored transparent synthetic resin. A shallow recessed portion 32 ranges over the front surface of the portion of the lens base member 29, which is for the lens sections 31, and the front surface of the upper and lower end parts of the remaining portions thereof. The shallow recessed portion 32 is covered with a coating member 33 made of red colored synthetic resin. The front lens 27 is formed by a multi-color molding technique. To be more specific, the lens base member 29 is first formed. The formed lens base member 29 is not taken from the mold. In this state, a part of the mold is replaced with another one, and the lens portion 28 and the coating member 33 are concurrently formed. The resultant lens 27 includes the lens base member 29, the lens section 28, and the coating member 33 in an integral form.

A surrounding wall 34 is formed on the rear side of the portion of the lens base member 29 where the shallow recessed portion 32 is formed. It surrounds an area smaller than the area of the portion for the shallow recessed portion 32.

The front lens 27 includes mounting legs 35, which protrudes rearward from the rear side of the circumferential edge of the lens and the rear side of the boundary part of the lens between the lenses 27 and 28. At the rear end of the lens section 31 for the side marker lamp 4, the mounting leg 35 protrudes from the end of the lower part of the surrounding wall 34.

A complementary lens 36, made of transparent synthetic resin, is inserted into and fixed to a space enclosed by the surrounding wall 34. The complementary lens 36 is fixed by a suitable fixing means, such as ultrasonic welding or bonding. Fisheye steps 37 are formed on a portion of the rear side of the complementary lens 36. Retroreflection elements 38 are formed on the remaining portion of the complementary lens 36.

The front lens 27 is secured to the lamp body 5 in a manner that the mounting legs 35 are inserted into the mounting groove 11 of the lamp body 5 and, in this state, it is fixed by means of a suitable fixing means, such as screws or bonding.

A diffusion section 39 with the fisheye steps 37 of the complementary lens 36 is disposed for covering the front of the window 24 of the shade 22 placed within the lens portion 31 in a state that the front lens 27 is mounted on the lamp body 5.

In the side marker lamp 4 of the combination tail lamp 1, light emitting from the bulb 26 passes through the window 24 of the shade 22 and is diffused through the fisheye steps 37. At night, the combination tail lamps 1 thus constructed and assembled on a vehicle are clearly viewed from the side of the vehicle, and one can clearly recognize the distance of the vehicle by the lamps.

When the lamp is lit off in the daytime, since most of the interior of the side marker lamp 4 is covered with the shade 22, except the window 24, the external appearance of the lamp is good.

A case where the lamp body 5 is applied to the combination tail lamps for the countries in which the side marker lamp 4 is not required for the vehicular lamp device, will be described.

An auxiliary body 17A is substantially the same as the auxiliary body 17 described above except that the former does not include the window 24.

A complementary lens 36A is different from the complementary lens 36 in that only the retroreflection elements 38 are formed over the entire rear side thereof.

In this instance, the auxiliary body 17A, in place of the auxiliary body 17, is mounted on the lamp body 5. The complementary lens 36A, in place of the complementary lens 36, is mounted on the lamp body 5 in the portion enclosed by the surrounding wall 34 of the lens base member 29. The bulb 26 is not mounted in the lamp chamber 8. The combination tail lamps 1A for the countries in which the side marker lamp 4 is not required, is thus constructed.

When the combination tail lamp 1A is lit on at night, the light beams coming from the side are reflected by the retroreflection elements 38, which are formed on the complementary lens 36A, toward the light source. A vehicle, which is approaching to the side of the vehicle carrying the combination tail lamp 1A, recognizes the presence of the lamp carrying vehicle in the front of the vehicle. In the daytime, the interior of the lamp chamber 8 is hidden by the shade 22. Accordingly, the external appearance of the combination tail lamp is not deteriorated.

As described above, according to the present invention, by merely exchanging some of the component parts thereof with other ones, the combination tail lamps may be manufactured in conformity with the requirements of the different standards employed by the countries to which the products are exported. The lamp bodies 5 as large components of the vehicle can be used in common, contributing to cost reduction.

As described above, a vehicular lamp device for a combination tail lamp according to the present invention comprises: a lamp body having a cup shape and a front opening; a bulb supported by the lamp body; a front lens covering the front opening of the lamp body; and a shade for cutting light off except a specific area in front of the bulb.

In the vehicular lamp device of the present invention, the shade member disposed on the inner side of the lens hides the bulb and its surrounding area when the lamp is lit off, thereby providing a good external appearance of the lamp.

It should be understood that the specific configurations of the component parts and the structures including them are illustrated and explained by way of example, and may variously be modified, changed and altered within the spirit and scope of the present invention.

What is claimed is:

1. A vehicular lamp device for a combination tail lamp comprising:

a lamp body having a cup shape and a front opening;

a bulb supported by said lamp body;

a front lens covering said front opening of said lamp body; and a shade disposed inside said front lens between said bulb and said lens, said shade having a light transmitting area and a light blocking area, said light transmitting area being in front of said bulb, said light blocking area of the shade being operative to cut off light except for light incident on said light transmitting area.

2. A vehicular lamp device according to claim 1, further comprising:

first and second lamp chambers adjacent to each other; and a partition wall separating said first and second chambers, said partition wall having a reflecting surface provided on a surface facing said first lamp chamber, said partition wall being integrated with a surface of said shade facing said second lamp chamber.

3. A vehicular lamp device according to claim 2, wherein said reflecting surface of said partition wall is subjected to reflection coating process.

4. A vehicular lamp device according to claim 2, wherein said reflecting surface of said partition wall is subjected to aluminum vapor process.

5. A vehicular lamp device according to claim 1, further comprising:

a complementary lens located between said front lens and said shade, said complementary lens having a reflection portion and a diffusion portion, said diffusion portion provided at a corresponding position of said light emitting area of said shade.

6. A vehicular lamp device according to claim 5, wherein said complementary lens has retroreflection elements serving as said reflection portion and fisheye steps serving as said diffusion portion.

7. A vehicular lamp device according to claim 5, wherein said shade has a window at said light emitting area.

8. A vehicular lamp device according to claim 7, wherein said complementary lens is disposed such that said diffusion portion of said complementary lens covers said window of said shade.

9. A vehicular lamp device according to claim 1, wherein an outer surface of said shade comprises a reflecting surface formed by a reflection coating process.

10. A vehicular lamp device according to claim 1, wherein an outer surface of said shade comprises a reflecting surface formed by an aluminum vapor deposition process.

11. A vehicular lamp device according to claim 1, wherein an outer surface of said shade comprises a silver coated surface formed by a silver coating process.

12. A vehicular lamp device according to claim 1, wherein said front lens is formed by a multi-color molding.

* * * * *